(12) United States Patent
Duron et al.

(10) Patent No.: US 8,315,562 B2
(45) Date of Patent: Nov. 20, 2012

(54) METHOD AND APPARATUS FOR REDUCING SPURIOUS RF SIGNALS IN RFID READER

(75) Inventors: Mark Duron, Patchogue, NY (US); Richard T. Knadle, Jr., Dix Hills, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 931 days.

(21) Appl. No.: 12/195,478

(22) Filed: Aug. 21, 2008

(65) Prior Publication Data

US 2010/0045435 A1 Feb. 25, 2010

(51) Int. Cl.
 *H04B 7/00* (2006.01)
(52) U.S. Cl. ........ 455/41.2; 455/277.1; 455/288; 455/289; 455/121; 455/303; 332/106; 340/572.1; 340/10.3; 340/572.4; 340/10.41; 340/10.1; 333/109; 375/334; 235/462.13
(58) Field of Classification Search ........... 455/41.2, 455/277.1, 288, 289, 121, 303; 332/106; 340/572.1, 10.3, 572.4, 10.41, 10.1; 333/109; 375/334; 235/462.13
See application file for complete search history.

(56) References Cited

U.S. PATENT DOCUMENTS

| | | | |
|---|---|---|---|
| 7,197,279 B2* | 3/2007 | Bellantoni | 455/41.2 |
| 7,239,858 B2* | 7/2007 | Bellantoni | 455/277.1 |
| 8,077,763 B2 | 12/2011 | Duron et al. | |
| 2005/0140457 A1* | 6/2005 | Bellantoni | 332/106 |
| 2005/0143026 A1* | 6/2005 | Bellantoni | 455/121 |
| 2005/0207509 A1 | 9/2005 | Saunders et al. | |
| 2005/0231367 A1* | 10/2005 | Bellantoni | 340/572.1 |
| 2008/0079547 A1* | 4/2008 | Alicot et al. | 340/10.3 |
| 2008/0136645 A1* | 6/2008 | Lin et al. | 340/572.4 |
| 2010/0102897 A1* | 4/2010 | Moritsuka et al. | 333/109 |

OTHER PUBLICATIONS

International Search Report and Written Opinion dated Nov. 11, 2009 in related case PCT/US2009/053972.
International Preliminary Report on Patentability for International Application No. PCT/US2009/053972 mailed on Mar. 3, 2011.

* cited by examiner

*Primary Examiner* — April G Gonzales (57) ABSTRACT

A method for improving RFID readers includes transmitting an outgoing RF signal to an antenna through a directional device, and generating a demodulated vector signal from an RF signal related to the RF signal received from the receiver. The method also includes setting the impedance of a controllable-variable-reflectance element with control-parameters from a memory circuit. The memory circuit includes a look up table having therein a corresponding relationship between the control-parameters and an error vector related to the demodulated vector signal.

12 Claims, 5 Drawing Sheets

METHOD AND APPARATUS FOR REDUCING SPURIOUS RF SIGNALS IN RFID READER

FIELD OF THE DISCLOSURE

The present disclosure relates generally to Radio Frequency Identification (RFID) technology.

BACKGROUND

Radio Frequency Identification (RFID) technology is one kind of Automatic Identification and Data Capture technologies. RFID technology generally involves interrogating an RFID tag with radio frequency (RF) waves and reading the responding RF waves with a RFID reader. A RFID tag typically includes a miniscule microchip coupled to an RF antenna. RFID tags can be attached to the object to be identified. An RFID reader typically includes an antenna coupled to a transmitter and a receiver.

Figure 1:
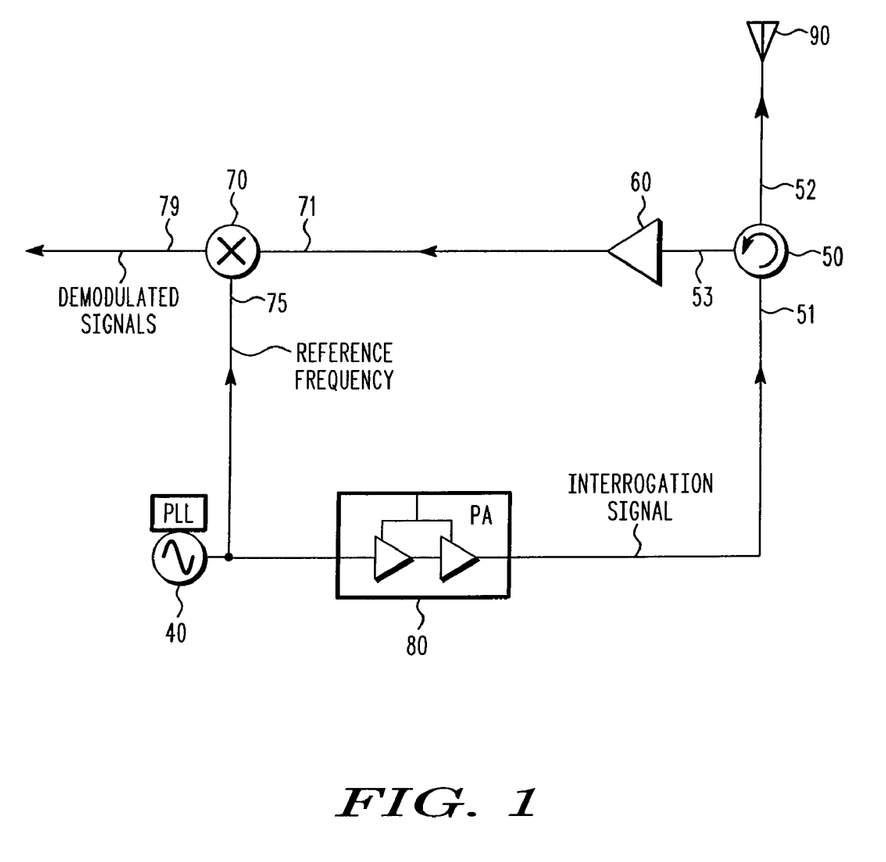
FIG. 1 shows a part of a simplified RFID reader in one specific kind of implementation.

FIG. 1 shows a part of a simplified RFID reader in one specific kind of implementation. In FIG. 1, the RFID reader includes an antenna 90 coupled to a transmitter 80 and a low noise amplifier 60. The RFID reader also includes a three-port circulator 50, a demodulator 70, and a frequency generator 40. The transmitter 80 can include a power amplifier (PA), and the frequency generator 40 can include a phase-licked-loop (PLL). The three-port circulator 50 includes a port 51, a port 52, and a port 53.

In operation, the transmitter 80 generates an RF interrogation signal. This RF interrogation signal is coupled to the antenna 90 through the three-port circulator 50. The electromatic waves radiated from the antenna 90 are then received by the antenna in an RFID tag. In response to the interrogation from the RFID reader, the RF tag will reflect responding electromagnetic waves coded with the identification information of the RF tag. The responding electromatic waves are picked up by the antenna 90 as a responding RF signal. The responding RF signal enters the port 52, leaves the port 53, and is received by the low noise amplifier 60. The RF signal received by the receiver, after amplification, is demodulated with demodulator 70 that receives a reference RF signal from the frequency generator 40. The demodulated signals from the demodulator 70 is coupled to certain signal processing circuit to decode from the demodulated signal the identification information returned by the RF tag. In some implementations, the demodulator 70 is a dual quadrature demodulator, and the demodulated signals from the demodulator 70 can be a demodulated vector signal that includes two components, the in-phase demodulated signal $I_{rx}$ and the quadrature demodulated signal $Q_{rx}$. This demodulated vector signal can be coupled to certain signal processing circuit for further signal processing.

In an ideal situation, the low noise amplifier 60 should only receive the responding RF signal generated by the RF tag that is coupled from the port 52 to the port 53. In reality, however, the low noise amplifier 60 also receives other RF signals generated from other sources or propagation paths. If the magnitude of these other RF signals are much larger than that of the responding RF signal generated by the RF tag, it will increase the difficulty for decoding the responding RF signal in order to obtain the identification information returned by the RF tag. Unfortunately, there are several other sources or propagation paths to generate these other RF signals for the simplified design of the RFID reader as shown in FIG. 1. First, even though majority of the RF interrogation signal generated by the transmitter 80 will be coupled to the port 52, some small fraction of the RF interrogation signal can still be coupled to the port 53 and received by the low noise amplifier 60. Second, because of possible impedance mismatch between the antenna 90 and the port 52, even for those RF interrogation signal transmitted to the port 52 form the port 51, some fraction of it can still be reflected back from the antenna 90, enter the port 52 and be coupled to the port 53. Third, when electromatic waves are radiated from the antenna 90, they are not just received by the antenna in the RFID tag, some fraction of these electromatic waves can be reflected from the objects nearby the RFID tag. These reflected electromatic waves can follow almost the same propagation path as that followed by the responding electromatic waves generated by the RF tag. Consequently, these reflected electromatic waves can generate some RF signals at the port 53.

To improve the signal quality of the responding RF signal generated by the RF tag as received by the receiver in the RF tag reader, it is desirable to minimize the RF signals at the input of the receiver which are generated from sources other than the RF tag.

SUMMARY

In one aspect, the invention is directed to a method. The method includes transmitting an outgoing RF signal to an antenna through a directional device having a first terminal receiving the outgoing RF signal and having a second terminal transmitting most of the outgoing RF signal to the antenna. The method includes receiving a RF signal from a third terminal of the directional device. The method includes generating a demodulated vector signal from an RF signal related to the RF signal received from the receiver. The method includes generating a group of at least two control-parameters from an error vector related to the demodulated vector signal based on a look up table having therein a corresponding relationship between the group of at least two control-parameters and the error vector. The method includes setting the impedance of a controllable-variable-impedance element with the group of at least two control-parameters from the memory circuit, wherein the controllable-variable-impedance element is coupled to a fourth terminal of the directional device.

In another aspect, the invention is directed to an apparatus. The apparatus includes a directional device, a memory circuit, and a controllable-variable-impedance element. The directional device has a first terminal, a second terminal, a third terminal, and a fourth terminal. The memory circuit is operable to output a group of at least two control-parameters in response to an error vector received by the memory circuit. The memory circuit includes a look up table having therein a corresponding relationship between the group of at least two control-parameters and the error vector. The controllable-variable-impedance element is coupled to the fourth terminal of the directional device. The controllable-variable-impedance element has the impedance thereof controllable with the group of at least two control-parameters received from the memory circuit.

In another aspect, the invention is directed to Low Temperature Co-fired Ceramic (LTCC) module. The LTCC module includes multiple layers of ceramic substrates, a first directional coupler, a second directional coupler (e.g., 320), a first capacitive element, and a second capacitive element, all which are constructed with the multiple layers of ceramic substrates. The first directional coupler has a first terminal, a second terminal, a third terminal, and a fourth terminal. The second directional coupler has a first terminal, a second terminal, a third terminal, and a fourth terminal. The first capacitive element has a first terminal and a second terminal. The second capacitive element has a first terminal and a second terminal. The first terminal of the second directional coupler is coupled to the fourth terminal of the first directional coupler, the second terminal of the second directional coupler is coupled to the first terminal of the first capacitive element, and the third terminal of the second directional coupler is coupled to the first terminal of the second capacitive element. The LTCC module can also include a resonator constructed with the multiple layers of ceramic substrates; the resonator has a first terminal coupled to the first terminal of the first directional coupler. The LTCC module can also include a harmonic filter constructed with the multiple layers of ceramic substrates; the harmonic filter has a first terminal coupled to the second terminal of the first directional coupler.

Implementations of the invention can include one or more of the following advantages. With the method and the apparatus described herein, spurious RF signals (such as signals reflected from objects nearby an RFID tag) received at the input of the receiver of an RFID reader can be reduced. When a portion of the forward RF signal from the transmitter is coupled to a controllable-variable-impedance element for reducing the spurious RF signals received at the input of the receiver, the signal power for controlling the impedance of such controllable-variable-impedance element can be much smaller than the power of the forward RF signal.

These and other advantages of the present invention will become apparent to those skilled in the art upon a reading of the following specification of the invention and a study of the several figures of the drawings.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 2:
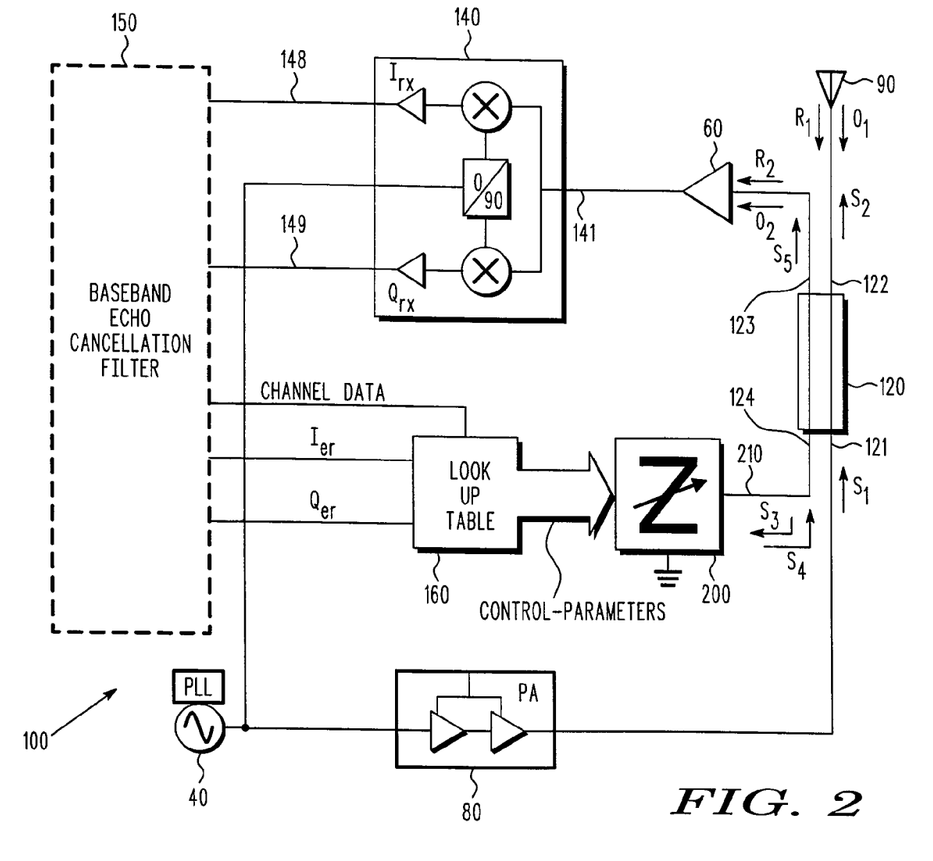
FIG. 2 is a block diagram of an RFID reader in accordance with some embodiments.

FIG. 2 is a block diagram of an RFID reader 100 in accordance with some embodiments. The RFID reader 100 includes a directional coupler 120, an RF amplifier 80, an antenna 90, a low noise amplifier 60, a demodulator 140, a filter 150, a memory circuit 160, and a controllable-variable-impedance element 200. The directional coupler 120 has a first terminal 121, a second terminal 122, a third terminal 123, and a fourth terminal 124. The RF amplifier 80 is coupled to the first terminal 121 of the directional coupler 120. The antenna 90 is coupled to the second terminal 122 of the directional coupler 120. The low noise amplifier 60 receives a RF signal from the third terminal 123 of the directional coupler 120. The demodulator 140 generates a demodulated vector signal from an RF signal related to the RF signal received from the low noise amplifier 60.

In one implementation, the demodulator 140 has an input 141 that is coupled to an output of the low noise amplifier 60. The demodulator 140 receives a reference RF signal from a frequency generator 40. The demodulator 140 also includes an output 148 for generating an in-phase demodulated signal $I_{rx}$ and an output 149 for generating a quadrature demodulated signal $Q_{rx}$. The in-phase demodulated signal $I_{rx}$ and the quadrature demodulated signal $Q_{rx}$ constitute two components of the demodulated vector signal.

In FIG. 2, the filter 150 receives the demodulated vector signal from the demodulator 140. The memory circuit 160 receives an error vector from the filter 150 and outputting a group of at least two control-parameters. The memory circuit 160 includes a look up table. The look up table contains a corresponding relationship between the group of at least two control-parameters and the error vector for each selected frequency in a list of selected frequencies. Therefore, for an error vector from the filter 150, the memory circuit 160 outputs a corresponding group of at least two control-parameters (as defined in the look up table) to the controllable-variable-impedance element 200.

In FIG. 2, the controllable-variable-impedance element 200 is coupled to the fourth terminal 124 of the directional coupler 120 and receives the group of at least two control-parameters from the memory circuit 160 to control the impedance of the controllable-variable-impedance element 200.

As shown FIG. 2, in operation, an outgoing RF signal $S_1$ is transmitted to the antenna 90 through the directional coupler 120 as RF signal $S_2$. When the outgoing RF signal $S_1$ enters the first terminal 121 of the directional coupler 120, most of the outgoing RF signal is transmitted to the second terminal 122 of the directional coupler 120. In response to an interrogation from the RFID reader 100 initialized by the outgoing RF signal, an RF tag will reflect responding electromagnetic waves coded with the identification information of the RF tag. A responding electromatic waves generated by an RF tag can be picked up by the antenna 90 as a responding RF signal $R_1$. The responding RF signal $R_1$ enters the second terminal 122 and leaves the third terminal 123 as responding RF signal $R_2$, which is then received by the low noise amplifier 60. In addition, electromatic waves reflected from other objects nearby the RFID tag can be also picked up by the antenna 90 as certain spurious RF signal $O_1$. The spurious RF signal $O_1$ also enters the second terminal 122 and leaves the third terminal 123 as spurious RF signal $O_2$, which is also received by the low noise amplifier 60.

As shown FIG. 2, in operation, all the RF signals received by the low noise amplifier 60, after amplification, is demodulated with from the demodulator 140. The demodulator 140 generating a demodulated vector signal that includes two components, the in-phase demodulated signal $I_{rx}$ and the quadrature demodulated signal $Q_{rx}$. The demodulated vector signal is sent to the filter 150 and generates an error vector, which also includes two components, the in-phase error signal $I_{er}$ and the quadrature error signal $Q_{er}$. The error vector is then coupled to the memory circuit 160 which outputs a group of at least two control-parameters based on some corresponding relationship as defined in a look up table.

As shown FIG. 2, in operation, the group of at least two control-parameters form the memory circuit 160 is sent to the controllable-variable-impedance element 200. The impedance of the controllable-variable-impedance element 200 is set with the group of at least two control-parameters in order to minimize the total RF signals at the carrier frequency received by the low noise amplifier 60. Here, the carrier frequency is the frequency of the reference RF signal generated from the frequency generator 40. When the outgoing RF signal $S_1$ enters the first terminal 121 of the directional coupler 120, a fraction of the outgoing RF signal is coupled to the fourth terminal 124 of the directional coupler 120 as RF signal $S_3$. This RF signal $S_3$ exits the fourth terminal 124 of the directional coupler 120 and is reflected by the controllable-variable-impedance element 200 as RF signal $S_4$. This RF signal $S_4$ reenters the fourth terminal 124 of the directional coupler 120 and leaves the third terminal 123 as RF signal $S_5$. This RF signal $S_5$ can be used to cancel all spurious RF signals at the carrier frequency at the input of the low noise amplifier 60, which includes the spurious RF signal $O_2$ due to the reflection from objects nearby the RF tag and all other spurious RF signals parasitically coupled to the input of the low noise amplifier 60 from different propagation paths and that portion of S5 which is caused by directional leakage from terminal 121. When the spurious RF signal at the carrier frequency is cancelled by properly adjusting the phase and the magnitude of the RF signal $S_5$, the signal quality of the RF signal $R_2$ originated from the RFID tag can be enhanced.

In FIG. 2, for cancelling the spurious RF signals at the carrier frequency at the input of the low noise amplifier 60, the phase and the magnitude of the RF signal $S_5$ is adjusted by setting the impedance of the controllable-variable-impedance element 200 with the group of at least two control-parameters from the memory circuit 160. There are many possible implementations of the controllable-variable-impedance element 200.

Figure 3:
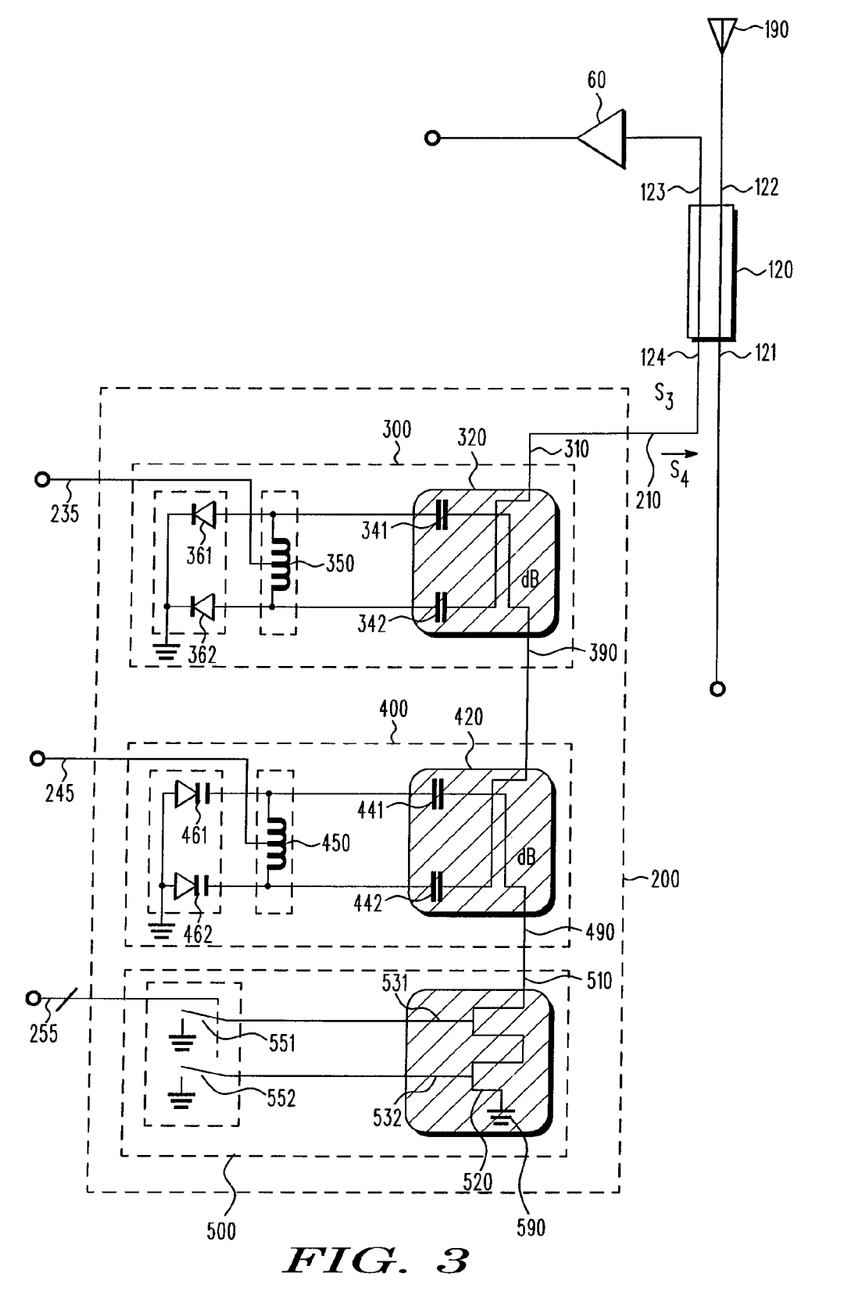
FIG. 3 is a schematic of a controllable-variable-impedance element in accordance with some embodiments.

FIG. 3 is a schematic of a controllable-variable-impedance element 200 in accordance with some embodiments. In FIG. 3, the controllable-variable-impedance element 200 includes the impedance-terminal 210 and some control inputs (e.g., control inputs 235, 245, and 255) for receiving control-parameters. The impedance at the impedance-terminal 210 can be adjusted by these control-parameters. The controllable-variable-impedance element 200 includes a controllable-variable-attenuation element 300, a first controllable-variable-phase element 400, and a second controllable-variable-phase element 500.

In FIG. 3, the controllable-variable-attenuation element 300 has two RF signal terminals 310 and 390, in addition to the control input 235. The controllable-variable-attenuation element 300 includes a directional coupler 320, capacitive elements 341 and 342, variable-resistive elements 361 and 362, and an inductive element 350. The inductive element 350 has a bias tap for receiving a bias voltage (which is used as an attenuation control signal) from the control input 235. In FIG. 3, the capacitive elements (i.e., 341 and 342) and the inductive element 350 are configured and connected with other elements in such a way to provide the isolation between the RF signal path and the DC signal path, which is the DC path for applying the bias voltage to the variable-resistive elements 361 and 362. In operation, a current applied to the control input 235 will control the attenuation of the controllable-variable-attenuation element 300 experienced by an RF signal passing through from one RF signal terminal to another RF signal terminal (i.e., from terminal 310 to terminal 390, or from terminal 390 to terminal 310).

In FIG. 3, the controllable-variable-phase element 400 has two RF signal terminals 410 and 490, in addition to the control input 245. The controllable-variable-phase element 400 includes a directional coupler 420, capacitive elements 441 and 442, variable-capacitive elements 461 and 462, and an inductive element 450. The inductive element 450 has a bias tap for receiving a bias voltage (which is used as a phase control signal) from the control input 245. In FIG. 3, the capacitive elements (i.e., 441 and 442) and the inductive element 450 are configured and connected with other elements in such a way to provide the isolation between the RF signal path and the DC signal path, which is the DC path for applying the bias voltage to the variable-capacitive elements 461 and 462. In operation, an voltage applied to the control input 245 will control the phase delay of the controllable-variable-phase element 400 experienced by an RF signal passing through from one RF signal terminal to another RF signal terminal (i.e., from terminal 410 to terminal 490, or from terminal 490 to terminal 410).

In FIG. 3, while the controllable-variable-phase element 400 can be used to make fine phase delay adjustment, the controllable-variable-phase element 500 can be used for making coarse phase delay adjustment in discrete steps. The controllable-variable-phase element 500 includes a delay line 520. The first end 510 of the delay line 520 is for receiving and returning RF signals. The second end 590 of the delay line 520 is grounded in order to reflect RF signals back into the delay line 520. There are multiple taps (e.g., 531 and 532) distributed along the delay line 520. The amount of phase delay of an RF signal after entering into the delay line 520 from the first end 510 and returning to the first end 510 from the delay line 520 depends upon which tap is selectively grounded. In one implementation, as shown in FIG. 3, each of the multiple taps (e.g., 531 and 532) can be grounded through a FET linear switch. For example, the tap 531 is grounded through an FET linear switch 551, and the tap 532 is grounded through an FET linear switch 552. These FET linear switches are controlled by the control-parameters received from the control input 255.

In operation, as shown in FIG. 3, the RF signal $S_3$ enters the impedance-terminal 210 will exit the impedance-terminal 210 as the RF signal $S_4$. The magnitude of the RF signal $S_4$ is proportional to the attenuation of the controllable-variable-impedance element 200. Thus, the magnitude of the RF signal $S_4$ can be controlled with the control-parameter applied to the control input 235. The phase of the RF signal $S_4$ is changed from the phase of the RF signal $S_3$ by an amount of the phase delay of the controllable-variable-impedance element 200. The phase delay of the controllable-variable-impedance element 200 is the sum of the phase delay due to the fixed delay of the variable attenuator 300, and the controllable-variable-phase element 400 and the phase delay due to the controllable-variable-phase element 500. Thus, the phase of the RF signal $S_4$ can be controlled with the control-parameters applied to the control input 245 and to the control input 255. In FIG. 3, the control-parameters applied to the control inputs 235, 245 and 255 of the controllable-variable-impedance element 200 can be provided by the memory circuit 160 as shown in FIG. 2.

Figure 4:
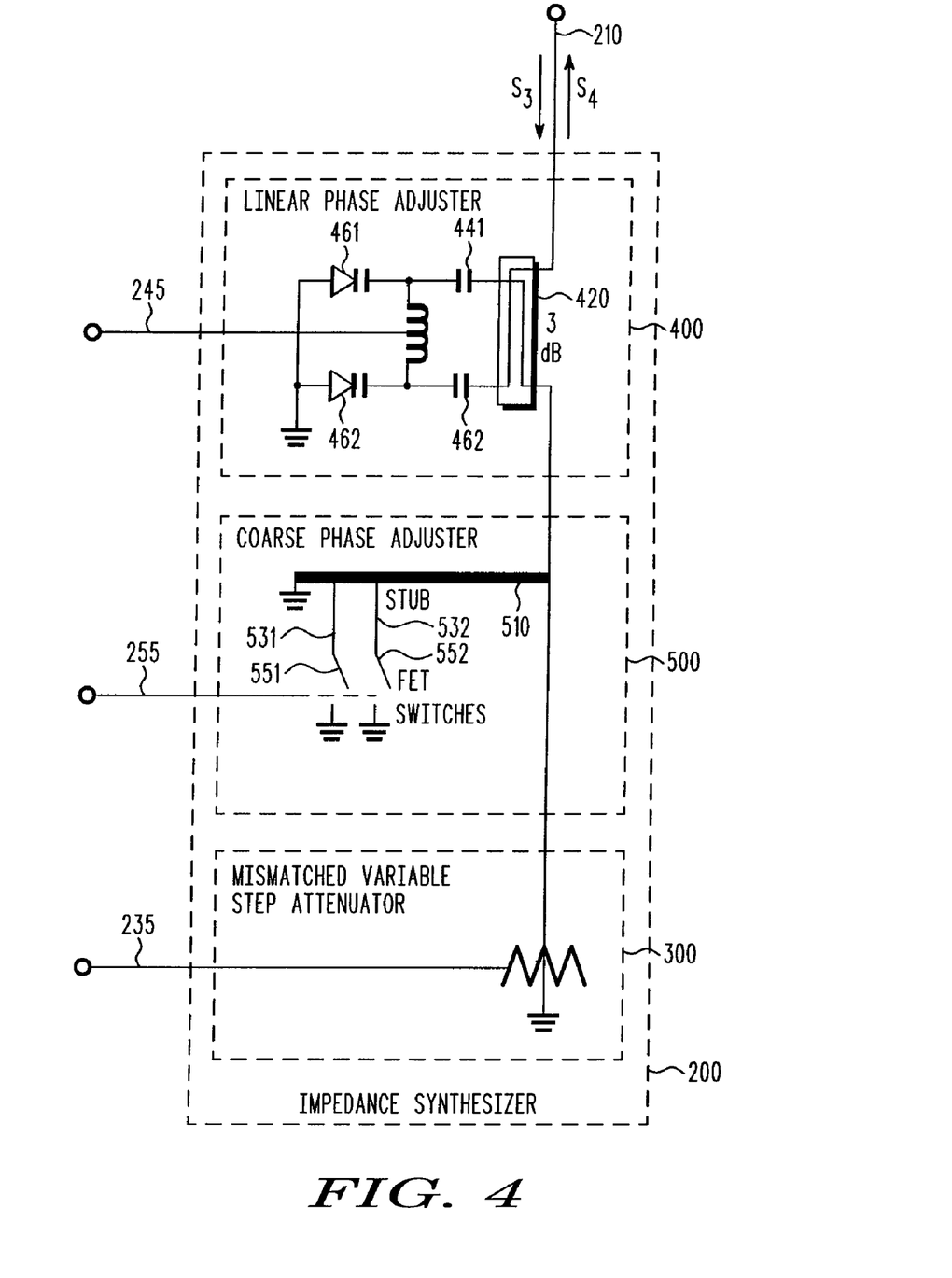
FIG. 4 shows another implementation of a controllable-variable-impedance element.

FIG. 4 shows another implementation of the controllable-variable-impedance element 200. The controllable-variable-impedance element 200 in FIG. 4, similar to that in FIG. 3, also includes a controllable-variable-attenuation element 300, a first controllable-variable-phase element 400, and a second controllable-variable-phase element 500. The first controllable-variable-phase element 400 in FIG. 4 has a similar design as that in FIG. 3. The second controllable-variable-phase element 500 in FIG. 4 has a similar design as that in FIG. 3. The controllable-variable-attenuation element 300 in FIG. 4, however, is a digitally variable step attenuator, which has a design different from that in FIG. 4.

In FIG. 4, the RF signal $S_3$ enters the impedance-terminal 210 will exit the impedance-terminal 210 as the RF signal $S_4$. The magnitude of the RF signal can be controlled with the control-parameter applied to the control input 235 of the controllable-variable-attenuation element 300. The phase of the RF signal $S_4$ can be controlled with the control-parameters applied to the control inputs 245 and the control input 255 of the controllable-variable-phase elements 400 and 500.

In addition to the exemplary implementations of the controllable-variable-impedance element 200 as shown in FIG. 3 and FIG. 4, there are other methods to change the phase and the magnitude of an RF signal after the RF signal is reflected from a terminal terminated with the controllable-variable-impedance element 200. For example, implementations for changing the phase can include a switched programmable delay line, a switched inductor array, a switched capacitor array, a MEMS phase shifter, a Miller capacitance multiplier, or a variable capacitance varicap. Implementations for changing the magnitude can include a switched resistor array, a PIN diode modulator, a programmer attenuator, a mixer, or a negative resistance device (e.g., Gunn and tunnel diodes). Implementations for changing both the magnitude and the phase can include an I-Q vector modulators or switched reactive stubs.

Figures 5A, 5B:
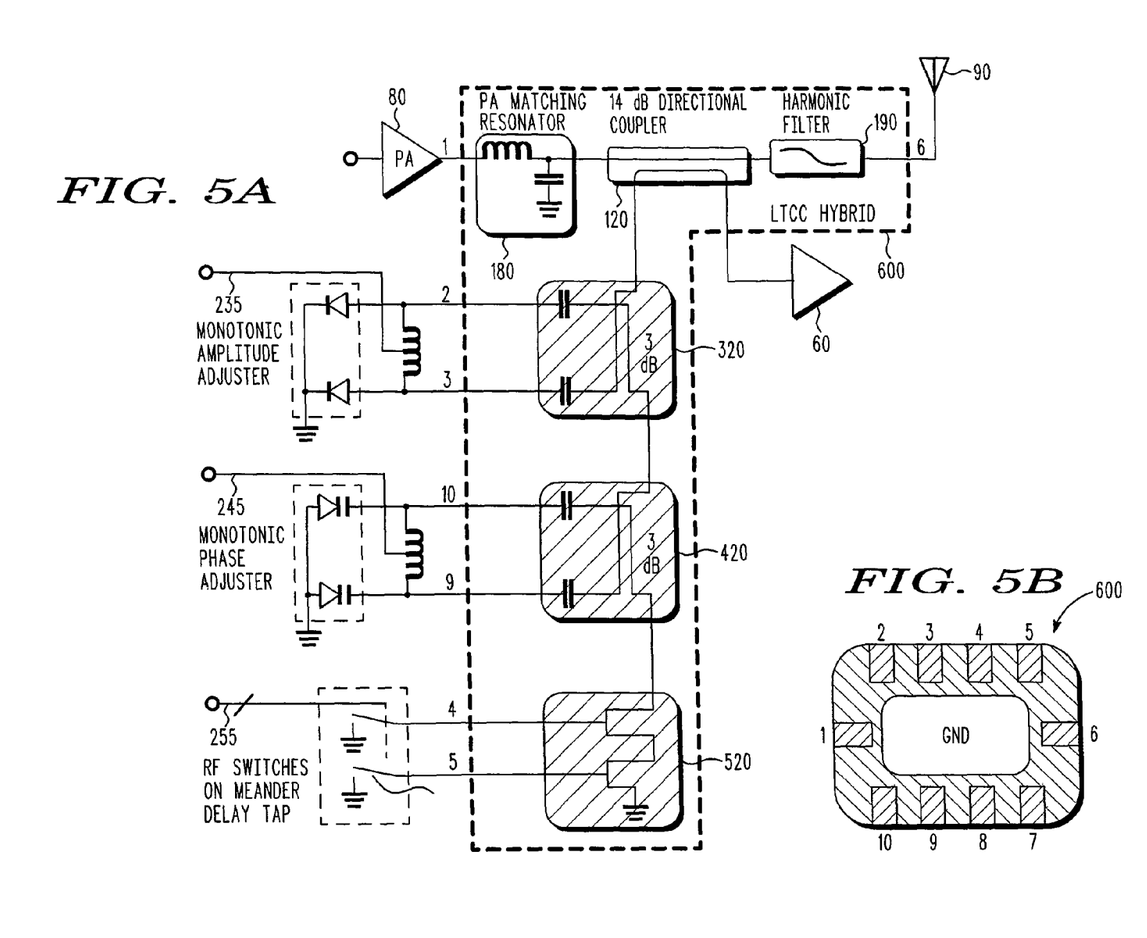
FIG. 5A and FIG. 5B shows that some of the components for the controllable-variable-impedance element can be implemented on an LTCC module.

FIG. 5A and FIG. 5B shows that some of the components for the controllable-variable-impedance element 200 in FIG. 3 and additional components for the RFID reader 100 in FIG. 2 can be implemented on one Low Temperature Co-fired Ceramic (LTCC) module 600. Such LTCC module 600 generally can be in the form of a miniature package with reduced production cost.

As shown in FIG. 5A, in one implementation, the LTCC module 600 includes three directional couplers (i.e., 120, 320, and 420) and one delay line 520. The LTCC module 600 can include a resonator 180 and a harmonic filter 190. The resonator 180 can be used to maximize the RF coupling between the transmitter 80 and the directional coupler at the carrier frequency. The harmonic filter 190 can be used to remove RF signals at the harmonics of the carrier frequency. In one implementation, the directional couplers (i.e., 120, 320, and 420), the delay line 520, the resonator 180, and the harmonic filter 190 can all be constructed on multi layers of ceramic substrates. Additionally, provisions for forward and reverse path envelope detectors can be added within the ceramic structure.

As shown in FIG. 5B, in one implementation, the LTCC module 600 is implemented in a miniature package with eight pins (i.e., PIN1, PIN2, . . . , PIN8). As shown in FIG. 5A, PIN1 is coupled to the resonator 180, PIN6 is couple to the harmonic filter 190, PIN7 is couple to the directional coupler 120. In addition, PIN2 and PIN3 are coupled to the directional coupler 320, PIN9 and PIN10 are coupled to the directional coupler 420, and PIN4 and PIN5 are coupled to the taps of the delay line 520. Finally, PIN8 is coupled to the grounding plane of the LTCC module 600. PIN7 is the output to the receiver.

In other implementations, a LTCC module can include more components or less components than the LTCC module 600 as shown in FIG. 5A. In one implementation, a LTCC module includes multiple layers of ceramic substrates, a first directional coupler (e.g., 120), a second directional coupler (e.g., 320), a first capacitive element, and a second capacitive element, all which are constructed with the multiple layers of ceramic substrates. The first directional coupler has a first terminal, a second terminal, a third terminal, and a fourth terminal. The second directional coupler has a first terminal, a second terminal, a third terminal, and a fourth terminal. The first capacitive element has a first terminal and a second terminal. The second capacitive element has a first terminal and a second terminal. The first terminal of the second directional coupler is coupled to the fourth terminal of the first directional coupler, the second terminal of the second directional coupler is coupled to the first terminal of the first capacitive element, and the third terminal of the second directional coupler is coupled to the first terminal of the second capacitive element.

In one implementation, the LTCC module can also include a resonator (e.g., 180) constructed with the multiple layers of ceramic substrates; the resonator has a first terminal coupled to the first terminal of the first directional coupler. In one implementation, the LTCC module can also include a harmonic filter (e.g., 190) constructed with the multiple layers of ceramic substrates; the harmonic filter has a first terminal coupled to the second terminal of the first directional coupler.

In one implementation, the LTCC module can further include a first inductive element constructed with the multiple layers of ceramic substrates; the first inductive element has a first terminal coupled to the second terminal of the first capacitive element; the first inductive element has a second terminal coupled to the second terminal of the second capacitive element; and the first inductive element further having a mid-tap.

In one implementation, the LTCC module can further include a delay line (e.g., 520) constructed with the multiple layers of ceramic substrates; the delay line has a first terminal coupled to the fourth terminal of the second directional coupler; and the delay line has multiple taps for programming a phase delay of the delay line.

In one implementation, the LTCC module can further include a third directional coupler (e.g., 420), a third capacitive element, and a fourth capacitive element, all of which are with the multiple layers of ceramic substrates. The third directional coupler has a first terminal, a second terminal, a third terminal, and a fourth terminal. The third capacitive element has a first terminal and a second terminal. The fourth capacitive element has a first terminal and a second terminal. The first terminal of the third directional coupler is coupled to the fourth terminal of the second directional coupler. The second terminal of the third directional coupler is coupled to the first terminal of the third capacitive element. The third terminal of the third directional coupler is coupled to the first terminal of the fourth capacitive element.

In one implementation, the LTCC module can further include a second inductive element constructed with the multiple layers of ceramic substrates. The second inductive element has a first terminal coupled to the second terminal of the third capacitive element. The first inductive element has a second terminal coupled to the second terminal of the fourth capacitive element, and the second inductive element further having a mid-tap.

In one implementation, the LTCC module can further include a delay line (e.g., 520) constructed with the multiple layers of ceramic substrates. The delay line has a first terminal coupled to the fourth terminal of the third directional coupler; and the delay line having multiple taps for programming a phase delay of the delay line.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

For example, the directional coupler 120 in FIG. 2 and FIG. 3 can be other kinds of directional devices. In some implementations, these directional devices can constructed with circulators and attenuation couplers. As another example, the FET linear switches 551 and 552 in FIG. 3 can be other kinds of switches, such as diodes. The diode can function as a switch when operating between a conducting mode and a non-conducting mode.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   transmitting an outgoing RF signal to an antenna through a directional device having a first terminal receiving the outgoing RF signal and having a second terminal transmitting most of the outgoing RF signal to the antenna;
   receiving a RF signal reflected by an RF tag from a third terminal of the directional device; generating a demodulated vector signal from a spurious RF signal and the RF signal received by the antenna;
   generating at least one attenuation control-parameter and at least one phase control-parameter from an error vector related to the demodulated vector signal based on a look up table containing a frequency dependent relationship between the control-parameters and the error vector;
   setting an attenuation of a controllable-variable-attenuation element of a controllable-variable-impedance element with the at least one attenuation control-parameter and setting a phase delay of a controllable-variable-phase element of the controllable-variable-impedance element with the at least one phase control-parameter; and
   reflecting the RF signal from the controllable-variable-impedance element to a fourth terminal of the directional device.

2. The method of claim 1, comprising:
   establishing a corresponding relationship between a group of at least two control-parameters and an error vector in a look up table for each selected frequency in a list of selected frequencies.

3. The method of claim 2, wherein the establishing a corresponding relationship between a group of at least two control-parameters and an error vector comprises:

selecting the group of at least two control-parameters corresponding to the error vector to minimize the spurious RF signal received from the antenna when the impedance of the controllable-variable-impedance element is set with the group of at least two control-parameters.

4. An apparatus comprising:
a directional device having a first terminal, a second terminal, a third terminal, and a fourth terminal;
an antenna coupled to the second terminal of the directional device for transmitting an outgoing RF signal and receiving a RF signal reflected by an RF tag and a spurious RF signal;
a demodulator generating a demodulated vector signal from the RF signal and the spurious RF signal received by the antenna;
a filter generating an error vector in response to the demodulated vector signal received from the demodulator;
a memory circuit operable to output a group of at least two control-parameters in response to the error vector received from the filter, and wherein the memory circuit includes a look up table containing a frequency dependent relationship between the group of at least two control-parameters and the error vector; and
a controllable-variable-impedance element coupled to the fourth terminal of the directional device, the controllable-variable-impedance element comprising a controllable-variable-attenuation element operable to receive an attenuation control-parameter from the memory circuit to control an attenuation of the controllable-variable-attenuation element and a controllable-variable-phase element operable to receive at least one phase control-parameter from the memory circuit to control a phase delay of the controllable-variable-phase element.

5. The apparatus of claim 4, further comprising:
an RF amplifier coupled to the first terminal of the directional device.

6. The apparatus of claim 4, further comprising:
a low noise amplifier coupled to the third terminal of the directional device.

7. The apparatus of claim 4, wherein the controllable-variable phase element comprises a fine controllable-variable-phase element and a coarse controllable-variable-phase element.

8. An apparatus comprising:
a directional device having a first terminal, a second terminal, a third terminal, and a fourth terminal;
a receiver receiving a RF signal from the third terminal of the directional device;
a demodulator generating a demodulated vector signal from a RF signal related to the RF signal received from the receiver;
a memory circuit coupled to the demodulator, the memory circuit receiving an error vector including at least one attenuation control-parameter and at least one phase control-parameter and outputting the control-parameters, the memory circuit including a look up table containing a frequency dependent relationship between the control-parameters and the error vector for each selected frequency in a list of selected frequencies; and
a controllable-variable-impedance element coupled to the fourth terminal of the directional device and comprising a controllable-variable-attenuation element operable to receive an attenuation control-parameter from the memory circuit to control an attenuation of the controllable-variable-attenuation element and a controllable-variable-phase element operable to receive at least one phase control-parameter from the memory circuit to control a phase delay of the controllable-variable-phase element.

9. The apparatus of claim 8, further comprising:
a filter coupled between the demodulator and the memory circuit, the filter receiving the demodulated vector signal from the demodulator and outputting the error vector to the memory circuit.

10. The apparatus of claim 8, further comprising:
an RF amplifier coupled to the first terminal of the directional device.

11. The apparatus of claim 8, further comprising:
an antenna coupled to the second terminal of the directional device.

12. The apparatus of claim 8, wherein the controllable-variable-phase element comprises a fine controllable-variable-phase element and a coarse controllable-variable-phase element.

* * * * *